Dec. 28, 1948.  R. R. OSBORNE ET AL  2,457,713
APPARATUS FOR TESTING THE OPERATION OF OXYGEN
SUPPLY EQUIPMENT FOR AIRCRAFT
Filed Aug. 9, 1945  3 Sheets-Sheet 1

Inventors
RONALD ROY OSBORNE
ERNEST GRAHAM DUNSFORD
By
Cushman, Darby & Cushman
Attorney Dec. 28, 1948. R. R. OSBORNE ET AL 2,457,713
APPARATUS FOR TESTING THE OPERATION OF OXYGEN
SUPPLY EQUIPMENT FOR AIRCRAFT
Filed Aug. 9, 1945 3 Sheets-Sheet 2

Inventors
RONALD ROY OSBORNE
ERNEST GRAHAM DUNSFORD
By
Cushman, Darby & Cushman
Attorneys Dec. 28, 1948.   R. R. OSBORNE ET AL   2,457,713
APPARATUS FOR TESTING THE OPERATION OF OXYGEN
SUPPLY EQUIPMENT FOR AIRCRAFT
Filed Aug. 9, 1945   3 Sheets-Sheet 3

Inventors
Ronald Roy Osborne
Ernest Graham Dunsford
By
Cushman, Darby & Cushman
Attorneys Patented Dec. 28, 1948

2,457,713

UNITED STATES PATENT OFFICE 2,457,713

APPARATUS FOR TESTING THE OPERATION OF OXYGEN SUPPLY EQUIPMENT FOR AIRCRAFT

Ronald Roy Osborne and Ernest Graham Dunsford, Farnborough, England, assignors to the Minister of Supply, in His Majesty's Government of the United Kingdom of Great Britain and Northern Ireland, London, England Application August 9, 1945, Serial No. 609,880
In Great Britain March 24, 1945

5 Claims. (Cl. 73—40)

This invention relates to apparatus for testing the operation of oxygen supply equipment for aircraft.

In aircraft designed to operate at altitudes above approximately 12,000 ft. a supply of oxygen must be made available for the crew to supplement that normally obtained from the atmosphere and such additional oxygen supply is normally stored at high pressure in cylinders or bottles suitably disposed in the aircraft and connected by flexible tubing or the like to positions adjacent to those occupied by the crew through an economiser. The supply tubing is coupled to a further tubing connected to the individual masks worn by the crew.

In such installations it is essential that the apparatus shall be free from leaks (a) to prevent wastage of the oxygen and (b) to ensure that when the crew are using oxygen there shall not be a dilution of the supply by the ingress of air to the system.

The object of the invention is to provide a portable apparatus for testing the oxygen supply equipment after installation in the aircraft and whilst the latter is still grounded.

The invention comprises a bellows connected to the oxygen supply, a pointer on the movable element of the bellows operating in conjunction with a fixed datum to register the volume of oxygen supplied to the apparatus and a tube to indicate that oxygen is flowing into the bellows.

The invention will be described with reference to the accompanying drawings.

Figure 1:
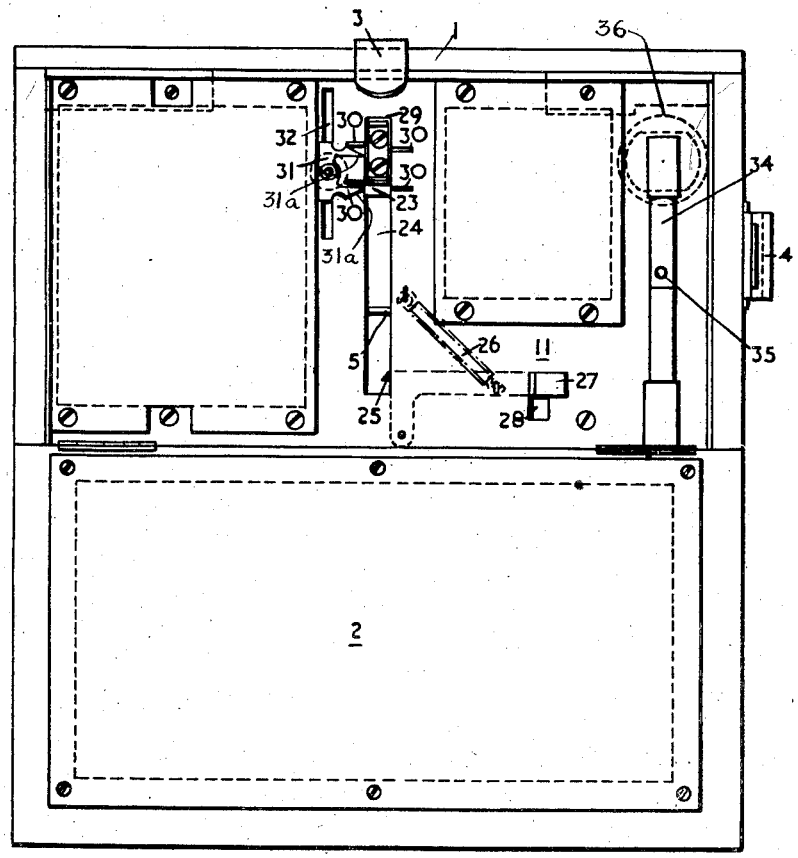
Fig. 1 is a front elevation of the apparatus with lid 2 open.

The apparatus comprises a casing 1 having a lid to cover 2 at one end hinged thereto and retained in the closed position by a spring clip 3, a handle 4 being provided for transport purposes. A bellows 5 is housed within the casing 1 provided with a supply pipe 6, one end of which projects into the rear of the casing and to which is attached by a bayonet or other joint 7 the oxygen supply pipe (not shown) from the economiser in the aircraft oxygen supply line. A plate 8 pivoted on the outside of the end of the casing 1 may be provided for masking the end of the pipe 6 when the apparatus is not in use.

The bellows 5 is formed with a rigid base 9 bent over at the rear end and attached to the casing by screws or bolts 10 and also supporting the supply pipe 6 and at the front end adapted to be screwed directly to the casing 1. A slotted front panel 11 is also supported by the rigid base 9.

The bellows 5 is constructed of resilient material such as leather, rubber or the like carried by the baseplate 9 and an upper member 12, preferably of wood or the like, pivoted to lugs 13 on the baseplate by brackets or hinge arms 14, a rod 15 passing through the lugs and brackets. Springs 16 are provided to open the bellows, adjustment being provided for setting the tension on the springs to the required value to produce the requisite suction on the bellows. One end of each spring 16 is affixed to a lug 17 on the base plate 9 and the other to a link 18 carried by a pin 19 passing through one of a plurality of holes 20 in the brackets 14 by means of which the suction characteristic may be varied. A spring loaded non-return valve 21 is provided in the upper member 12 through which the contents of the bellows may be expelled to close the bellows.

Figure 2:
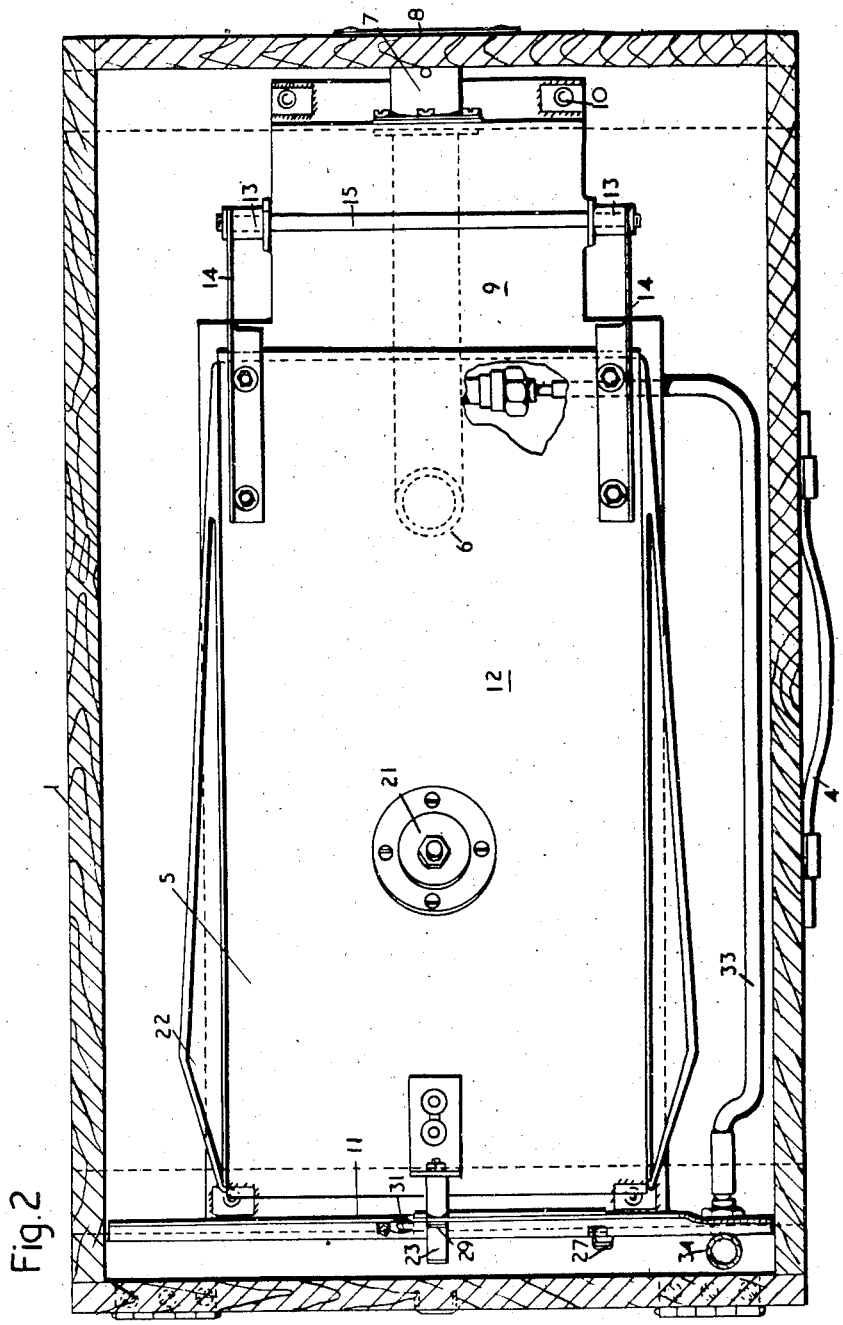
Fig. 2 is a plan view with the casing in section.
Figure 3:
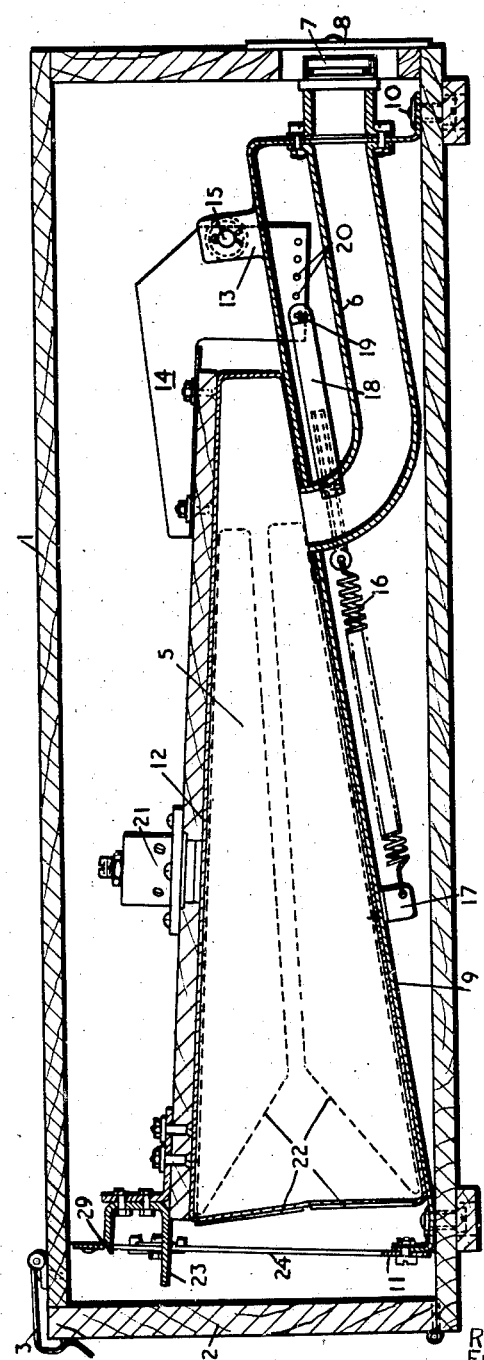
Fig. 3 is a longitudinal section.

The sides and front end of the bellows 5 are preferably stiffened by plates 22 having their adjoining edges positioned adjacent each other as shown in Figures 2 and 3 so that the bellows will fold only along established lines. This ensures that the bellows when deflated close in a predetermined manner and that on inflation a progressive increase of the interior volume in a regular and constant manner may be obtained.

The upper member 12 carries an arm 23 which projects through the slot 24 in the panel 11 by which the bellows 5 may be deflated and retained in this position by a pivoted bolt 25 loaded by a spring 26. The bolt 25 may be withdrawn from the arm 23 to allow the bellows to open under the action of the springs 16 by a lever 27 projecting through a slot 28 in the panel 11.

The arm 23 is also formed with a pointer 29 projecting through the slot 24 to follow the opening of the bellows 5 and operates in conjunction with markings 30 on the panel to indicate the maximum and minimum permissible supply of oxygen from the economiser. More than one pair of maxima and minima markings may be provided for economisers having differing rates of flow. A cursor 31 sliding in a slot 32 in the panel is provided for determining the leakage from the economiser.

A pipe 33 from the supply pipe 6 communicates with a transparent tube 34 arranged vertically on the panel, a ball 35 or other indicating means being provided in the tube 34 to give visual means for showing that oxygen is flowing from the economiser or supply line. A rubber mushroom or other non-return valve 36 is provided to allow oxygen to escape from the upper end of the tube 34 and prevent the entry of air when the bellows are opening.

In use the apparatus is connected by the supply pipe 6 to an oxygen economiser into which oxygen flows from a supply cylinder or bottle, the apparatus taking the place of the airman's lungs and mask. As the bellows is closed and locked by bolt 25 (corresponding to expiration) the economiser bag fills with oxygen and the pressure within the bag rises until it is sufficient to open a mica valve in the economiser (not shown) to allow a small quantity of gas to escape into the bellows. The pressure which this builds up in the bellows closes the mica valve of the economiser and the gas in the bellows escapes through the valve 21 of the apparatus. The cycle is repeated rapidly and the oxygen therefore overflows from the economiser in a series of small puffs, a portion of each puff being by-passed through the pipe 33 and tube 34, causing the ball 35 to rise up and down in the tube, thus indicating that the economiser is overflowing. Should the mica valve of the economiser be defective, a steady flow of oxygen through the bellows and out of the valve 21 will take place and the indicator ball will remain stationary.

When the bolt 25 is released and the bellows open (corresponding to inspiration), a small suction is applied to the economiser outlet. This suction is slightly less than that which would be applied by normal breathing, thus providing a safety margin, but it is sufficient to open the mica valve of the economiser and oxygen will therefore flow into the bellows until the economiser bag is empty. This flow from the economiser is indicated by a rapid rise of the bellows pointer 29 to a position between the markings 30.

Cessation of flow from the economiser allows the mica valve to close and the pointer 23 will remain stationary at the end of its rapid rise and should come to rest between a pair of marks 30. If the economiser bag does not fill or empty completely, the pointer will not rise to the height of the lower mark of the pair. If air is drawn in through a hole or leaky joint, the pointer will rise above the upper mark.

The rise of the pointer 29 is also a measure of the contents of the economiser bag and if this bag is refilled and isolated from the supply for a short time (for example, 30 seconds), any leakage is shown by a lower pointer reading when the bag contents are re-measured.

The cursor 31 is provided with two arms 31'a spaced apart a distance representing the leakage permissible from the economiser in 30 seconds. Thus, if the economiser bag is filled and the upper arm 31a of the cursor is set at the level to which the pointer 29 rises on release of the bolt 25 then, if the economiser bag is again filled and isolated from the source of supply for a period of 30 seconds, for example, before the bellows is again released, the pointer 29 should rise at least to the lower arm 31a of the cursor, indicating that the permissible leakage has not been exceeded. Of course, if the leakage exceeds the limits laid down and denoted by the two arms 31a of the cursor 31, then the pointer 29 will not rise to the level of the lower arm 31a.

We claim:

1. Apparatus for testing the operation of oxygen supply apparatus comprising a bellows adapted to be connected to the oxygen supply, a bolt for locking said bellows in the closed position, and spring means for opening said bellows on release of said bolt, a pointer on the movable element of the bellows, a fixed datum in conjunction with which the pointer works to register the volume of oxygen supplied to the apparatus when said bellows is opened under the action of said spring means, on release of said bolt, and means to indicate that oxygen is flowing into the apparatus when said bellows is locked in the closed position.

2. Apparatus for testing the operation of oxygen supply apparatus comprising a bellows adapted to be connected to the oxygen supply apparatus, a bolt for locking said bellows in a closed position, spring means for opening said bellows on release of said bolt, stiffened sides and ends on the bellows to ensure that on deflation the bellows close in a prodetermined manner so that a progressive increase of the interior volume may be obtained on inflation, a pointer on the movable element of the bellows, a fixed datum in conjunction with which the pointer works to register the volume of oxygen supplied to the apparatus when said bellows is opened under the action of said spring means, on release of said bolt, and means to indicate that oxygen is flowing into the apparatus when said bellows is locked in the closed position.

3. Apparatus for testing the operation of oxygen supply apparatus as in claim 2 in combination with a slotted panel mounted vertically on the stationery member of the bellows through the slot in which the pointer projects and calibrations on said panel adjacent the slot to indicate acceptable limits of pointer movement.

4. Apparatus for testing the operation of oxygen supply apparatus comprising a bellows connected to the oxygen supply, a pointer on the movable element of the bellows, a slotted panel mounted vertically on the stationary member of the bellows through the slot in which the pointer projects, calibrations on said panel adjacent the slot to indicate acceptable limits of pointer movement, a tube on the panel connected to the oxygen supply, a ball in the tube to indicate that oxygen is flowing thereto and non-return valves on the tube and on the bellows.

5. Portable apparatus for testing the operation of oxygen supply apparatus comprising a bellows connected to the oxygen supply, a pointer on the movable element of the bellows, a slotted panel mounted vertically on the stationary member of the bellows through the slot in which the pointer projects, calibrations on said panel adjacent the slot to indicate acceptable limits of pointer movement, a tube on the panel connected to the oxygen supply, a ball in the tube to indicate that oxygen is flowing thereto, non-return valves on the tube and on the bellows, and a casing within which the bellows are housed.

RONALD ROY OSBORNE.
ERNEST GRAHAM DUNSFORD.

REFERENCES CITED

The following references are of record in the file of this patent:

UNITED STATES PATENTS

| Number | Name | Date |
|---|---|---|
| 80,847 | Wheeler | Aug. 11, 1868 |
| 2,089,432 | Ryan | Aug. 10, 1937 |
| 2,345,387 | Elsey | Mar. 28, 1944 |

FOREIGN PATENTS

| Number | Country | Date |
|---|---|---|
| 177,033 | Great Britain | Mar. 23, 1922 |
| 644,253 | France | June 4, 1928 |